United States Patent
Fioravanti

[15] 3,697,767
[45] Oct. 10, 1972

[54] ELECTRIC ENERGY DISTRIBUTION SYSTEMS

[72] Inventor: Leonardo Fioravanti, Moncalieri, Italy

[73] Assignee: Carrozzeria Pininfarina Societa per Azioni via Lesna, Grugliasco (Turin), Italy

[22] Filed: Jan. 27, 1971

[21] Appl. No.: 110,201

[30] Foreign Application Priority Data

Feb. 12, 1970    Italy.....................67459 A/70

[52] U.S. Cl....................307/10 R, 174/117, 339/95, 307/38, 307/147, 307/10 LS
[51] Int. Cl. ............................................H02g 3/00
[58] Field of Search........307/11, 41, 40, 39, 38, 147, 307/10 R, 10 LS; 339/95, 96, 97, 98, 99; 200/166 CT, 168 E; 174/117 F, 117 FF, 117 R

[56] References Cited

UNITED STATES PATENTS

| 3,564,280 | 2/1971 | Sognefest.................307/10 R |
| 2,950,338 | 8/1960 | Taylor....................174/117 F |
| 3,551,585 | 12/1970 | Smart et al..........174/117 FF |

*Primary Examiner*—Herman J. Hohauser
*Attorney*—Sughrue, Rothwell, Mion, Zinn & Macpeak

[57] ABSTRACT

An power distribution system for distributing electrical power; from a source of supply to selected loads. The distribution system includes a composite cable having a power lead and a plurality of control leads with electrically operated switches associated with each load whereby an appropriate signal on a control lead triggers the switch which then connects the appropriate load to the power lead. The composite cable has a thin plastics sheath which can be pierced by the electrical pin-shaped terminals of the transistors forming the switches, and the invention also provides a template which unambiguously locates the transistors.

9 Claims, 4 Drawing Figures

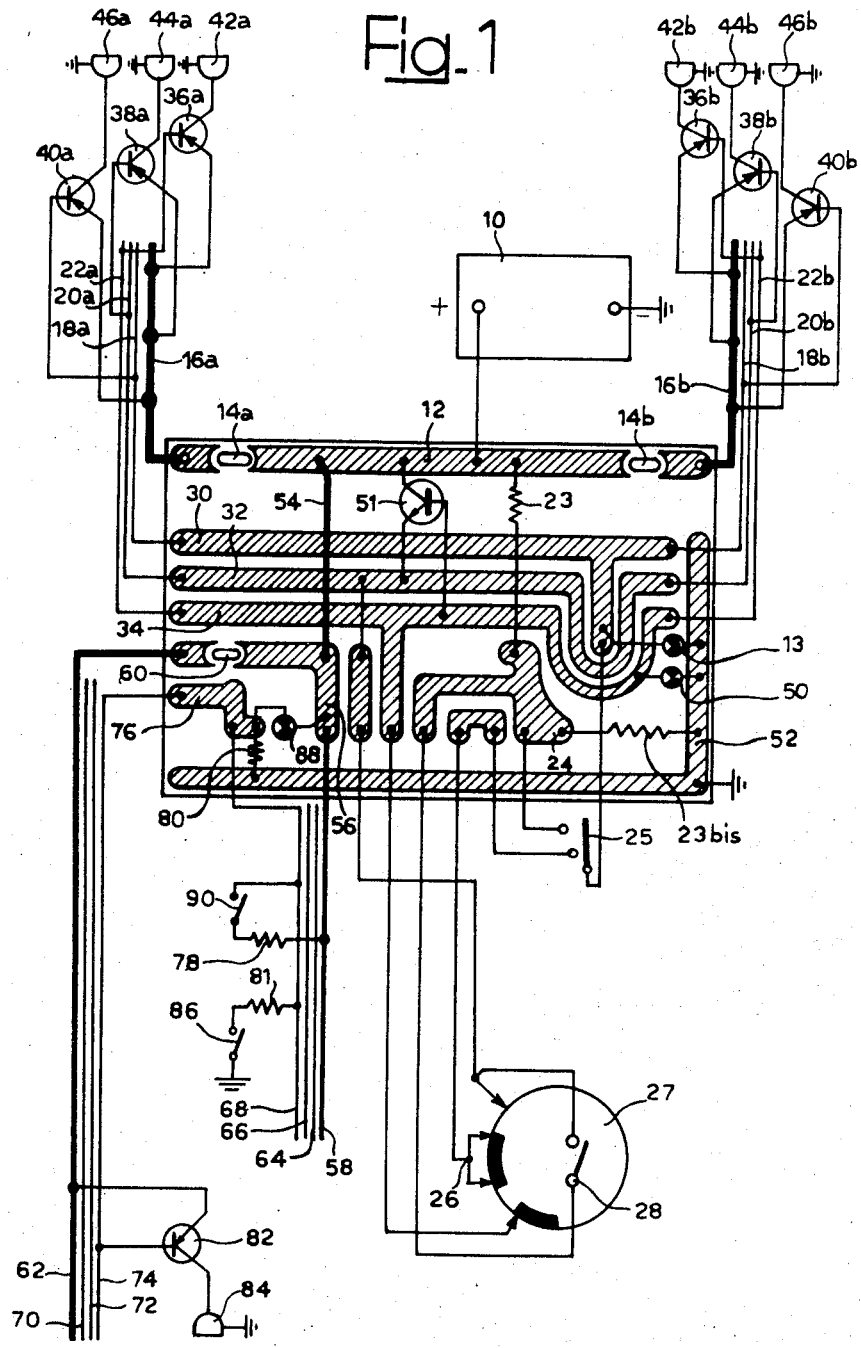

ELECTRIC ENERGY DISTRIBUTION SYSTEMS

The present invention relates to an electric power distribution system, especially, but not exclusively, for vehicles, household domestic appliances, and the like.

With the increase in the number and sophistication of electrical appliances electric power distribution systems have become more and more complicated. For example, the number of power supply wires running through a motor vehicle has increased considerably. Since, in motor vehicles, the majority of the controls are collected together on a panel centralized upon the dashboard of the vehicle, and most of the appliances are situated in positions around the sides of the vehicle, there is a wastefully large number of lead wires. This results in increased cost of the electrical system due to the relatively high cost of the copper of which the leads are made.

Similarly the costs of insulation are now greater owing to the variety and multiplicity of the circuit paths along which the leads have to be taken. Another cause of increased costs is the relative complexity of the control switches which have to carry the whole current of every appliance.

According to the present invention an electric power distribution system for distributing electric power from a source of supply to a plurality of electrical loads, comprises a composite cable having a power lead and several control leads, and switching means responsive to control signals on one or more control leads to switch electrical power from the power lead to respective loads.

Systems constructed in accordance with the present invention have the advantage of a considerable saving of copper in proportion to the overall power carried by the system.

Another advantage of embodiments of the present invention is that they can be constructed with less weight and the size of the control switches and commutators for the appliances can be made substantially smaller than hithertofore.

Systems constructed in accordance with the present invention can function safely with a reduction in the number of safety fuses as against conventional systems.

One embodiment of the invention will now be more particularly described by way of example, with reference to the accompanying drawings, in which:

FIG. 1 is a simplified partial diagram of a power distribution system for some of the electrical appliances of a motor vehicle;

Figure 4:
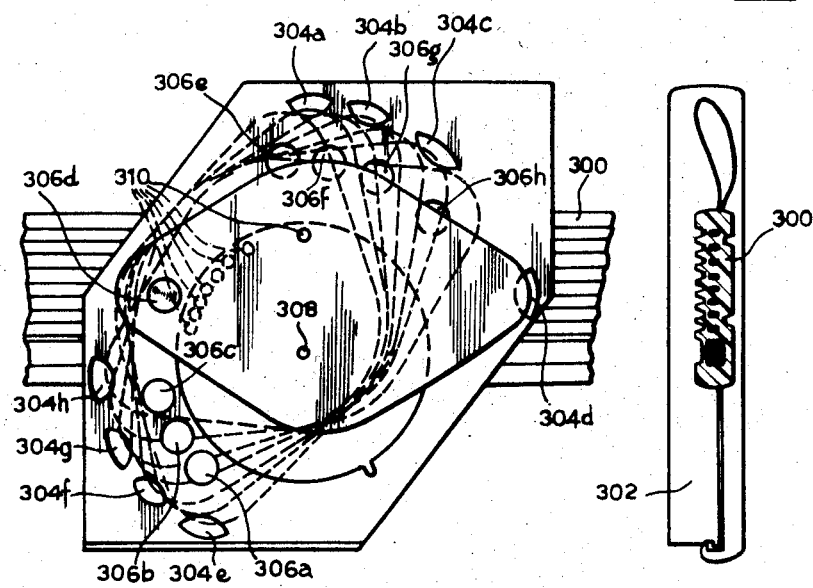
FIG. 4 is a plan view of FIG. 3.

In FIG. 1 only the electric system of the head lamps and the electric system of the brake of a motor vehicle are shown. A normal 12 volt battery 10 supplies a main track 12 of a printed circuit, which supplies, by means of two links 14a and 14b, a pair of front power leads 16a and 16b. With each of the power leads 16a and 16b there are connected several control wires 18a, 20a, 22a and 18b, 20b and 22b respectively. From the main track 12 the current is carried to a track 24 via a resistive potential divider 23 and 23a, which lowers the voltage from the 12 volts of the battery to 5 volts which is required for the control leads. The voltage of 5 volts, which will hereinafter be termed the low voltage, and which is on the track 24 is carried to a main terminal 26 of a commutator 27 when a switch 25 is closed. The closing of the switch 25 also applies current to the flashing switch 28 of the commutator 27. From the terminals of the commutator 27 the voltage is led to the tracks 30, 32 and 34 of the printed circuit. These tracks respectively supply the control leads 18a, 18b, 20a, 20b, 22a and 22b. The low voltage on the tracks 30, 32 and 34 is therefore led to the base of each of the transistors 36a, 36b, 38a, 38b, 40a and 40b, the emitters of which are connected to the power leads 16a and 16b respectively, and the collectors of which are respectively connected to different loads. In this case the loads are the head-lamp driving beams 42a, 42b; the head-lamp driving beams 44a, 44b; and of the side lamps 46a, 46b. The presence of the low voltage at one of the bases of the transistors switches on the transistor causing current from the power leads 16a and 16b to pass through the transistor via the emitter and collector of the corresponding transistor, finally flowing to earth after passing through the load.

The low voltage on the tracks 30 and 34 also causes current to flow in the side lamp warning lights 48 and of the driving head lamp warning lights 50, these warning lights are connected between the tracks 30, 34 and on earthing track 52. Therefore, applied to the warning lamp bulbs is not the voltage of the power circuits (12 volts), but the voltage control circuits (5 volts).

A transistor 51 between the high voltage track 12 and the head-lamp track 32 is switched on by the presence of a voltage in the track 34, thus when the beamed head-lamps, 42a, 42b are switched on the transistor operates, to keep the non-beamed lamps 44a, 44b alight at the same time as the beamed ones.

With reference to FIG. 1, the foot brake and the hand brake lights and warning lights operate as follows. The high voltage (12 volts) which is on the track 12 is transferred, by means of a bridge 54, to a track 56, which feeds a central power lead 58 and, via a link 60, a rear power lead 62. With the power lead 58 there are associated control leads 64, 66 and 68, and with the power lead 62 there are associated control leads 70, 72 and 74. In this specification the control leads 64, 66, 70 and 72 respectively are shown without connections, and it is supposed that they are led to sources of supply which are not illustrated. To the electric circuit of the brakes, on the other hand, there are led only the control leads 68 and 74, connected via the track 76 of the printed circuit. A resistive potential divider 78, 80 is provided for lowering the voltage from 12 to 5 volts for the track 76.

Between the lead 68 and the earth there is inserted a switch 86 connected to the lever of the hand brake upon the closing of which the track 76 is earthed and hence the hand brake warning light 88 is illuminated.

Between the power lead 58 and the control lead 68 there is a switch 90 connected to the foot brake pedal. The closing of the switch 90 connects the lead 68, the conductor track 76 of the printed circuit, the lead 74, and hence the base of the transistor 82 to the low voltage via the potential divider 78, 80. The transistor 82 thus becomes conductive and feeds current from the power lead 62 to the stop indicator light 84. The resistance 81 protects against short circuiting if it should happen that switches 86 and 90 should be operated simultaneously. Since the lead track 76 works at a voltage equal to that of track 56, the hand brake warning light 88 is not illuminated. The different operation of the switches 86 and 90, the former between the earth and the control lead 68, the latter between the power lead 58 and the control lead 68 makes it possible therefore to control different functions by the same control lead, with the object of keeping as low as possible the number of control leads.

It is obvious that a single safety fuse will be necessary for each power lead, rather than for each appliance, as in prior distribution systems.

Figure 2:
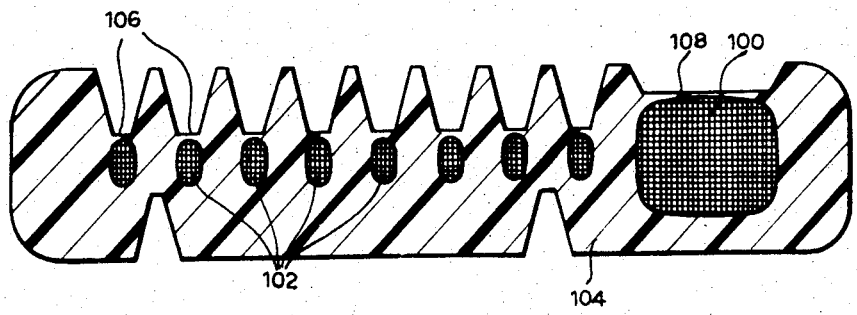
FIG. 2 is a cross section of a composite cable for use in the electric power distribution system shown in FIG. 1.

FIG. 2 shows the power lead and its associated control leads assembled together into a single composite cable. The power lead 100, of copper or some other high conductance metal, is of sufficiently large cross-section to carry the highest current which can be used by the largest contemplated load, and several control wires, eight in the present case, of small diameter, to carry the few milli-amperes needed to switch the transistors of the loads, are transversely aligned and enclosed in a cover or sheath 104 of flexible plastic insulating material.

The cover 104 has longitudinal grooves 106 aligned with the control leads 102, and a wider groove 108 over the power lead 100. Thanks to these grooves there is, corresponding to each lead 100, 102, a region of very little thickness of the cover, through which it is possible to penetrate a point contact connected to a terminal of, for example, a transistor. The composite cable has dimensions of about 16mm×3.5mm, and can therefore be bent and curved, thanks both to the flexibility of the plastic material of the cover and also to the flat shape due to the cross-alignment of the leads 100, 102.

Figure 3:
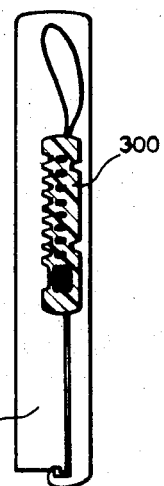
FIG. 3 is a cross section of the cable shown in FIG. 2 on to which is placed a support template for a transistor.

In FIG. 3 the composite cable 300 is enclosed by a cover 302, arranged to facilitate the insertion of transistors on to the leads of the cable 300. The cover 302 is shown with a stretch of cable 300, in plan view, in FIG. 4.

The cover 302 forms a template for fitting the transistors and to this end has pairs of assemblage holes 304a, 306a, 304b . . . 304h, 306h, each of which pairs of assemblage holes is arranged to receive a transistor unambiguously in a predetermined position, so that the hole 304 of each pair of holes, receives a tongue borne upon the casing of the transistor, whilst the round hole 306 of the same pair receives a fixing screw. The arrangement is such that each pair of holes is able to receive the transistor only in a single predetermined position.

The transistors for use with which the template 302 is designed, have extending from their lower surface two leads which constitute the terminals of the emitter and of the base respectively. The lead 308 of the emitter terminal is positioned by the template 302 so that it can perforate the insulating sheath 104 at the depression 108 and is thus driven into the power lead 100. The base terminal 310a, b, . . . , or h on the other hand is positioned to perforate the insulating sheath 104, over one of the grooves 106, thus being driven into a predetermined control lead, determined by the position of the transistor in relation to the composite cable, which in its turn is determined by the placing of the particular pair of holes upon the template formed by the cover 302.

The assembly of each transistor is thus simple and immediate, and is such as to prevent errors of insertion. In order further to facilitate assembly, it is provided that each transistor shall carry on the surface of the casing a symbol showing the appliance in the circuit of which the transistor is to be connected.

In order to keep to a minimum the number of control leads connected to the power lead, the present invention also includes provision for the use of two transistors each of different polarity. In this way every control lead will be able to send out two different signals, one positive and one negative with respect to an arbitrary earth potential. This of course would call for a more complicated printed circuit and the use of a battery with an intermediate earth tap.

It can be seen how the invention, by separating the power circuits from the control and warning circuits, makes possible a considerable saving in copper, inasmuch as a motor vehicle will contain a few composite cables which lead off from a central printed circuit to positions on the side of the side vehicle with the loads plugged into and supplied from a single power lead of the composite cable, whilst the controls can be applied with low voltages and small current to control leads of very small diameter. Moreover the wiring of the system from the point of view of production, and the maintenance and repair of the system after its completion work out to be considerably simpler, especially if the components of the system are standardized.

The present invention has been described and illustrated with particular reference to the electrical system of a motor vehicle, but it is clear that the distribution principle according to the invention may be applied in many other cases, particularly in household domestic appliances such as programmed washing machines, dishwashers, and the like, or even to the wiring of houses themselves.

Moreover, many modifications and variations are possible to the embodiment described in the present specification; in particular, the number of control leads can be different or electronic or electro-mechanical switching means other than the transistors illustrated may be used.

What is claimed is:

1. An electrical power distribution system for distributing power from a source to a plurality of loads, said system comprising:
    a. a composite cable having a power lead and a plurality of control leads, said power lead and said plurality of control leads being housed within a single insulating sheath, wherein said power lead is connected to said source; and
    b. a plurality of electrically operated switches, each of said switches having a first pin-shaped current carrying terminal means for driving through said insulating sheath into said power lead, a second current carrying terminal means for connection to one of said plurality of loads, and a pin-shaped control terminal means for driving through said insulating sheath into a selected one of said control leads, whereby energization of one of said plurality of control leads, operates a corresponding one of said plurality of switches thereby supplying power from said source to a corresponding one of said plurality of loads.

2. The system of claim 1, wherein said switches are semi-conductor electronic devices.

3. The system of claim 1, wherein said composite cable is flexible and substantially flat.

4. The system of claim 3, wherein said insulating sheath of said cable has longitudinal grooves aligned with said leads, so that the insulating sheath has a reduced thickness where said pin-shaped terminal means are driven into said leads.

5. The system of claim 4, wherein the distance between the pin-shaped terminal means in each switch of the system is constant and not less than the transverse separation between the power lead and the farthest control lead, said switches being connected to said cable in an angular position such that the pin-shaped terminal means are driven into the appropriate leads.

6. The system of claim 5 further including a template having positioning means for the angular positioning of each switch.

7. The system of claim 1 where in said source is a battery of a motor vehicle and said loads are electrical appliances of the motor vehicle.

8. The system of claim 2 wherein said semiconductor devices are transistors of a given polarity.

9. The system of claim 2 wherein said semiconductor electronic devices are transistors, and there are at least two transistors of opposite polarities connected to different loads controlled by the same control lead by signals of opposite polarity.

* * * * *